(12) United States Patent
Renken et al.

(10) Patent No.: US 6,325,536 B1
(45) Date of Patent: Dec. 4, 2001

(54) INTEGRATED WAFER TEMPERATURE SENSORS

(75) Inventors: Wayne Glenn Renken, San Jose; Mei H. Sun, Los Altos; Paul Miller, Fremont; Roy Gordon, San Jose, all of CA (US); Peter Michael Noel Vandenabeele, Lier (BE)

(73) Assignee: SensArray Corporation, Fremont, CA (US)

( * ) Notice: Subject to any disclaimer, the term of this patent is extended or adjusted under 35 U.S.C. 154(b) by 0 days.

(21) Appl. No.: 09/113,240

(22) Filed: Jul. 10, 1998

(51) Int. Cl.$^7$ ............................. G01K 11/00; G01K 11/20
(52) U.S. Cl. ........................ 374/161; 374/166; 374/131; 374/137
(58) Field of Search ..................... 374/137, 161, 374/166, 131

(56) References Cited

U.S. PATENT DOCUMENTS

| | | | |
|---|---|---|---|
| 4,437,772 | 3/1984 | Samulski | 374/129 |
| 4,448,547 | 5/1984 | Wickersheim | 374/131 |
| 4,569,570 * | 2/1986 | Brogardh et al. | 385/12 |
| 4,576,486 | 3/1986 | Dils . | |
| 4,626,110 | 12/1986 | Wickersheim et al. . | |
| 4,916,497 * | 4/1990 | Gaul et al. | 357/19 |
| 4,986,671 | 1/1991 | Sun et al. . | |
| 4,988,212 | 1/1991 | Sun et al. . | |
| 5,087,124 * | 2/1992 | Smith et al. | 356/482 |
| 5,183,338 | 2/1993 | Wickersheim et al. . | |
| 5,299,869 * | 4/1994 | Wissinger | 374/137 |
| 5,381,231 | 1/1995 | Tu | 356/352 |
| 5,393,371 * | 2/1995 | Chang et al. | 156/629 |
| 5,436,494 | 7/1995 | Moslehi | 257/467 |
| 5,470,155 | 11/1995 | Jensen | 374/161 |
| 5,489,988 * | 2/1996 | Ackley et al. | 356/436 |
| 5,746,513 | 5/1998 | Renken | 374/179 |
| 5,775,808 | 7/1998 | Pan | 374/161 |
| 5,830,277 * | 11/1998 | Johnsgard et al. | 118/725 |
| 5,876,119 * | 3/1999 | Ishikawa et al. | 374/134 |
| 5,967,661 * | 10/1999 | Renken et al. | 374/126 |
| 5,969,639 * | 10/1999 | Lauf et al. | 340/870.17 |

OTHER PUBLICATIONS

Claus, R.O. et al., "Embedded Optical Fiber Sensors for Materials Evaluation", *Journal of Nondestructive Evaluation*, vol. 8, No. 2, Jun. 1989, pp. 135–145.

"Fiber–Optic Sensing of Physical Parameters," by MetriCor of Woodinville, WA, published in *Sensors—The Journal of Machine Perception*, vol. 5, No. 10 (Oct. 1998) article consists of four pages.

\* cited by examiner

*Primary Examiner*—Diego Gutierrez
*Assistant Examiner*—Cydia M De Jesús
(74) *Attorney, Agent, or Firm*—Skjerven Morrill MacPherson LLP

(57) ABSTRACT

Systems and methods are described for integrated (embedded) semiconductor wafer temperature measurement equipment and processes. An integrated wafer temperature measurement apparatus, comprising: a substrate; a placement resource formed in said substrate; a sensor lead located in said placement resource, said sensor lead having a first end and a second end; a sensor coupled to said first end of said sensor lead and located in said placement resource; and a sensor lead cover coupled to said substrate. The systems and methods provide advantages in that reliability is enhanced, installation and removal are facilitated, and accuracy is improved by obviating any shadowing of the substrate and reducing temperature gradients near the sensor.

41 Claims, 7 Drawing Sheets

INTEGRATED WAFER TEMPERATURE SENSORS

BACKGROUND OF THE INVENTION

1. Field of the Invention

The invention relates generally to the field of temperature measurement. More particularly, the invention relates to integrated (embedded) wafer temperature measurement equipment and processes for temperature characterization and calibration.

2. Discussion of the Related Art

The use of wafer temperature measurement equipment is well known to those skilled in the art of semiconductor fabrication. In the past, temperature measurements have been taken from semiconductor wafers by attaching thermocouple leads to the top or into a cavity open to the top of the wafer, or alternatively, to the bottom of the wafer through access holes in the pedestal supporting the wafer. For example, a conventional semiconductor wafer temperature measurement system typically includes a plurality of thermocouples bonded to the top of a test wafer to define an array pattern. The thermocouple leads are routed out of the processing chamber through an electrical connector in a vacuum flange feedthrough or through a flat cable or an interconnect placed under an O-ring seal.

A problem with this technology has been that many wafer processing steps include the use of a plasma. It would be useful if temperature measurements could be made within an active plasma environment. However, a plasma environment is not compatible with thermocouples due to the ambient radio frequency (RF) power and high RF and direct current (DC) voltages. The thermocouples can act as receiving antenna and may be heated up to their melting point by RF currents passing along the leads. Also, the large RF voltage that is picked up by the thermocouple wires disturbs the very small DC voltage generated by the thermocouples. Another disadvantage of thermocouples mounted in a plasma ambient is that the RF energy may be conducted out of the chamber through the leads and this would create a potential safety hazard for the operators of the equipment and would disturb the operation of the equipment. Therefore, what is needed is a wafer temperature measurement solution that is compatible with a plasma environment.

Another problem has been that the external thermocouple leads can drain heat from or conduct heat to the measurement junction or the substrate. The temperature gradient between the ambient and the substrate causes heat flow from or to the junction or substrate through the thermocouple leads. Another source of error relates to the thermal conduction, energy absorption and emissivity properties of the bonding material used to attach the thermocouples to the substrate. Perturbation of substrate temperature can originate from radiation energy gain or loss differences between the substrate and bond material.

A previous approach to addressing this problem is described in U.S. Pat. No. 5,746,513, the entire contents of which are incorporated by reference, which describes reducing the temperature gradient in the sensor leads near the sensing junction to minimize measured temperature offset. However, this approach by itself does not solve the heat loss or gain problem, and does not provide for protection from ion bombardment causing local over heating and erosion of sensor materials. Therefore, what is also needed is a solution that results in lower heat loss or gain through the sensor leads, provides a nearly isothermal region for sensing temperature, and protects the sensor assembly from early failure related to erosion of sensor materials and overheating of the sensor from ion bombardment.

Another problem with this technology has been that it can be difficult for personnel who are installing the temperature measurement equipment to connect the sensor leads to the feedthrough connector. Typically, access to the interior of the processing chamber is limited to one port, and it can be awkward and time consuming to make the electrical connection between the sensor leads and the vacuum feedthrough. This problem can be encountered upon both installation and removal of the wafer-sensor assembly from the processing chamber. What is also required, therefore, is a wafer temperature measurement solution that results in a system that is easier to install and remove.

Another problem with this technology has been that the physical presence of the thermocouple leads can shadow the wafer. Often, a substantial fraction of the energy available to heat the wafer will be incident from a position that is above the wafer as it rests on the pedestal within the processing chamber. The presence of the thermocouple leads can attenuate the energy flowing from the heating source to the wafer, thereby altering the temperature of the wafer compared to the situation in which there are no thermocouple leads. For example, the level of heating provided by radiation (e.g., infrared lamps) can be affected by the presence of the thermocouple leads. There is less incident radiation on those surface areas of the wafer where shadows are cast by the thermocouple leads. Thus, the presence of the thermocouple leads can change the temperature of the wafer compared to the situation in which there are no thermocouple leads. As another example of shadowing, the level of heating provided by ion bombardment can be affected by the presence of the thermocouple leads. The thermocouple leads can reduce the number of ions striking the wafer per unit time, thereby reducing the kinetic energy being transferred to the wafer. Consequentially the temperature of the wafer is lower compared to the situation in which there are no thermocouple leads. Therefore, what is also required is a wafer temperature measurement solution that does not shadow the wafer.

Meanwhile, it has been known how to measure temperature optically. For, example, U.S. Pat. No. 4,437,772 discloses luminescent decay time techniques for temperature measurement. Optical pyrometry has been used to measure the temperature, based on the intensity of radiation emitted from a wafer surface.

The use of fiber optic temperature measurement sensors is known to those skilled in the art and fiber optic temperature measurement sensors are readily commercially available. U.S. Pat. No. 4,448,547 discloses an optical temperature measurement technique utilizing phosphors. U.S. Pat. No. 5,470,155 discloses an apparatus and method for measuring temperatures at a plurality of locations using luminescent-type temperature sensors which are excited in a time sequence.

These fiber-optic probes have a number of problems when attached to a wafer surface to measure its temperature. It is not an accurate measurement of the wafer temperature because the sensor is encapsulated in a thick insulating material and forms a poor thermal contact with the surface of the wafer. The loosely held sensor leads passing above the wafer surface are not heat sunk by the substrate and are excessively heated by ion bombardment reducing their life and causing surface degradation.

Meanwhile, it has been known how to measure temperature optically, by measuring the intensity of radiation emitted from the wafer (a pyrometer). It shares the problems of the other probes that it requires a fixed installation in the system. Additional problems are that the pyrometer probes are sensitive to unknown variations of the emissivity of the wafer, and that they are sensitive to ambient radiation, reflected and transmitted through the wafer.

Heretofore, the wafer temperature measurement requirements have not been fully met. What is needed is a solution that simultaneously addresses all of the following requirements: durability, reliability, measurement accuracy, ease of installation and removal, avoidance of shadowing, avoidance of heat transfer from the wafer through the sensor leads, and compatibility with a plasma environment.

SUMMARY OF THE INVENTION

A primary object of the invention is to provide a device for obtaining wafer temperature measurements. Another primary object of the invention is to provide a procedure for obtaining wafer temperature measurements. Another primary object of the invention is to provide a procedure for making a device for obtaining wafer temperature measurements.

In accordance with these objects, there is a particular need for an integrated wafer temperature measurement approach that is based on sensors that are embedded in the wafer (i.e., integrated wafer temperature sensors). Thus, it is rendered possible to simultaneously satisfy the above-discussed requirements of durability, reliability, measurement accuracy, ease of installation and removal, avoidance of shadowing, avoidance of heat transfer from the wafer through the sensor leads, and compatibility with a plasma environment which in the case of the prior art are not being simultaneously satisfied.

A first aspect of the invention is implemented in an embodiment that is based on an integrated wafer temperature measurement apparatus, comprising: a substrate; a placement resource formed in said substrate; a sensor lead located in said placement resource, said sensor lead having a first end and a second end; a sensor coupled to said first end of said sensor lead and located in said placement resource; and a sensor lead cover coupled to said substrate. A second aspect of the invention is implemented in an embodiment that is based on a method of obtaining wafer temperature measurements with an integrated wafer temperature measurement device, said method comprising: providing said integrated wafer temperature measurement device; positioning said integrated wafer temperature measurement device in a wafer processing chamber; coupling said integrated wafer temperature measurement device to a signal conditioner and to a data acquisition resource; and then transmitting temperature measurement information from said integrated wafer temperature measurement device to said data acquisition resource through said signal conditioner. A third aspect of the invention is implemented in an embodiment that is based on a method of making an integrated wafer temperature measurement device, said method comprising: providing a substrate having a first side and a second side; forming a placement resource in said substrate; positioning a sensor and a sensor lead within said placement resource; attaching said sensor lead to said substrate; and placing an opaque cover over the sensor and sensor leads and the substrate area next to the leads.

These, and other, objects and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

Figure 1:
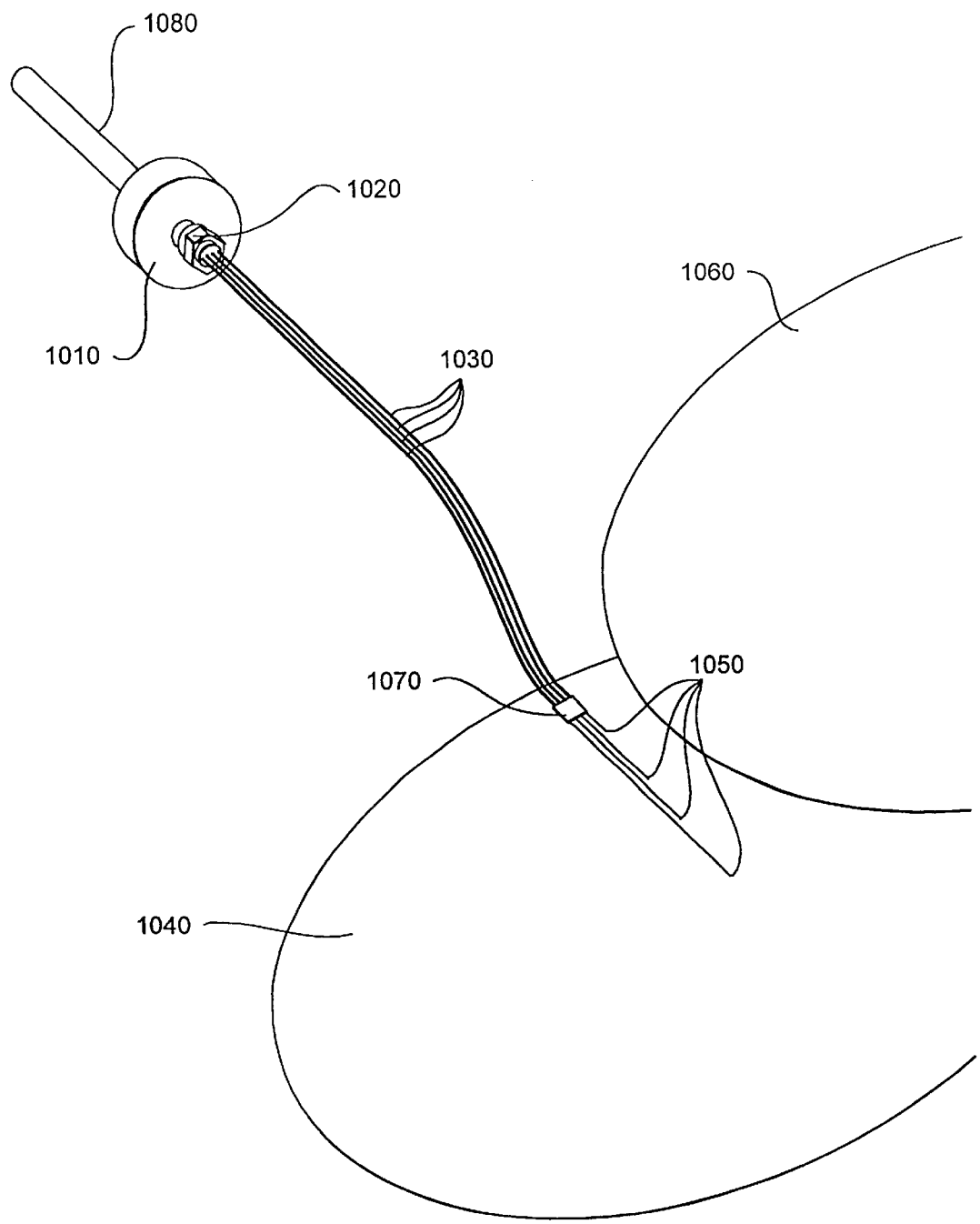
FIG. 1 illustrates a schematic partially exploded perspective view of a first integrated wafer temperature measurement device, representing an embodiment of the invention.

The invention and the various features and advantageous details thereof are explained more fully with reference to the nonlimiting embodiments that are illustrated in the accompanying drawings and detailed in the following description. Descriptions of well known components and techniques are omitted so as not to unnecessarily obscure the invention in detail.

The invention is based on embedding sensors in the bulk of a wafer. The embedding can be in channels and/or trenches and/or grooves that are formed in the wafer. These channels and/or trenches and/or grooves allow the sensors and the sensor leads to be routed through the wafer so that the resulting device is both more reliable and easier to install and remove. Further, these routed sensor leads do not significantly interfere with the heat transfer processes that determine the temperatures being measured, or the pedestal that supports the wafer within the processing chamber. These channels and/or trenches and/or grooves can be machined or etched into the wafer. A cover is placed over the sensor and the sensor leads situated in the grooves. It also ensures that the sensor is at the same temperature as the bulk wafer. The cover also functions as a light barrier and a protective shield for the sensors and sensor leads from the high energy plasma ion bombardment.

The context of the invention is semiconductor wafer temperature measurement within semiconductor wafer processing chambers, especially plasma processing chambers. The invention can also utilize data processing methods that transform the sensor signals so as to actuate or proportionally control interconnected discrete hardware elements, such as, for example, heaters, plasma generators, vacuum pumps.

Referring to the drawings, detailed descriptions of a number of aspects of the invention are provided with respect to the views shown in the figures. FIGS. 1–4 show four preferred embodiments of integrated wafer temperature measurement devices. FIGS. 5A–5D and 6A–6D show eight examples of different placement resource arrangements.

First Embodiment

Referring now to FIG. 1, a first embodiment of an integrated wafer temperature sensor device is shown. An optical cable 1080 which is connected to a vacuum feedthrough flange 1010 is fitted with a connector 1020. A first end of the optical cable 1080 is coupled to a signal conditioner (not shown) which in turn is coupled to data acquisition resources (not shown), such as, for example, a computer. The signal conditioner can include an excitation energy source and an emission energy detector. A second end of the optical cable 1080 is coupled to a plurality of optical fibers 1030 through the connector 1020.

At least one optical fiber 1030 is coupled to a wafer 1040. The term coupled is defined as connected, but not necessarily directly (and not necessarily mechanically directly). Although in this embodiment the plurality of optical fibers 1030 are mechanically connected to the wafer 1040, they can be optically coupled, as discussed in a later embodiment.

At least one optical fiber 1030 is located in a placement resource formed in the wafer 1040. In this embodiment, the placement resource includes four parallel trenches etched in the wafer 1040. The phrase placement resource is defined as physical structure to accommodate at least a portion of the length of one or more sensor leads beneath an upper surface of a substrate. In this embodiment, the substrate is the wafer 1040. The concept of placement resource will be discussed in more detail later, especially with regard to FIGS. 5A–5D and 6A–6D.

The plurality of optical fibers 1030 can be attached to the wafer 1040 with an adhesive (not shown), such as, for example, an epoxy or a polyimide. The adhesive or bonding material can be applied at intermittent positions. Alternatively, the adhesive or bonding material can be applied continuously along the plurality of optical fibers 1030. Both the adhesive and the sensor lead should be accommodated within the volume defined by the placement resource so that they do not protrude above a plane defined by an Lipper surface of the wafer 1040.

Each of the plurality of optical fibers 1030 is surrounded with a buffer for mechanical protection. This buffer can be a polyimide.

Each of the plurality of optical fibers 1030 terminates at a sensing element 1050. The sensing element 1050 is a temperature sensitive object. The sensing element 1050 should also be accommodated within the volume defined by the placement resources.

In the embodiment depicted in FIG. 1, a cover 1060 is coupled to the wafer 1040 after the plurality of optical fibers 1030 are connected to the wafer 1040. In this embodiment, the cover 1060 is mechanically connected to the wafer 1040 with a uniform thin layer of adhesive or by fusion bonding. By coupling the cover 1060 to the wafer 1040, at least a portion of the length of the plurality of optical fibers 1030, all of the sensing element 1050, and all of the adhesive (not shown) are embedded (integrated) since at least a portion of a length of the plurality of optical fibers 1030, all of the sensing element, and all of the adhesive were accommodated within the placement resource.

It can be appreciated that the use of a cover that is the same size and shape as the wafer (matching cover) permits the resulting assembly to embed a large number of sensors. For example, the use of a matching cover permits an array of sensors spanning the entire surface of the wafer to be covered, embedded, and integrated all at once.

A strain relief device 1070 is coupled to the plurality of optical fibers 1030 and the wafer 1040. The strain relief device 1070 helps to hold the plurality of optical fibers 1030 in place. The strain relief device 1070 also minimizes the stress placed on the plurality of optical fibers 1030. In this embodiment, the strain relief device should also be accommodated within the placement resource because a cover plate of the same size and shape as the wafer 1040 is being used. Alternatively, the cover plate can include a cut out relief to accommodate the geometry of the strain relief 1070.

Second Embodiment

Figure 2:
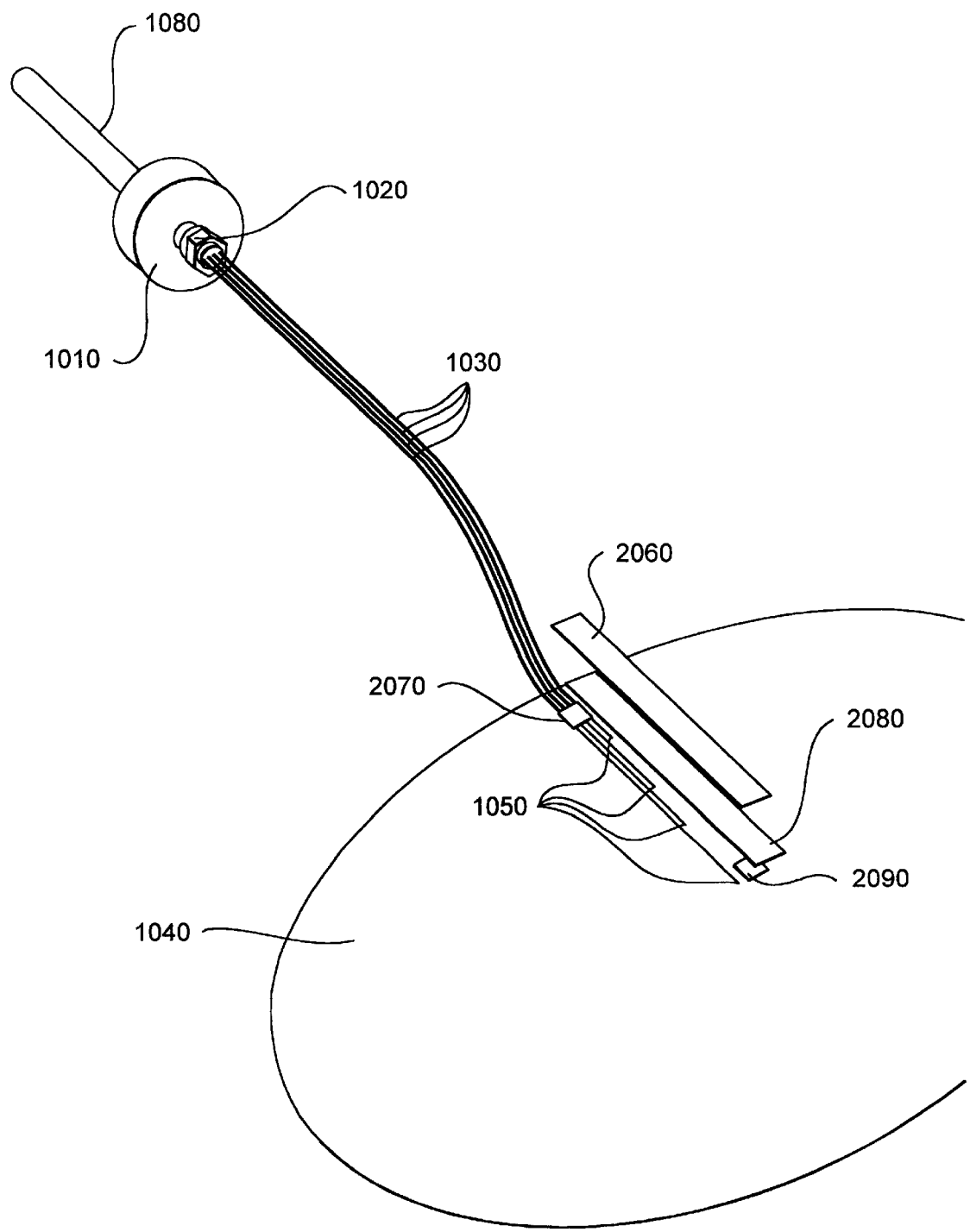
FIG. 2 illustrates a schematic partially exploded perspective view of a second integrated wafer temperature measurement device, representing an embodiment of the invention.

Referring now to FIG. 2, a second embodiment of an integrated wafer temperature sensor device is depicted. In this embodiment, the plurality of optical fibers 1030 are located within a placement resource that includes a set of four substantially parallel grooves cut in a wafer 1040.

Generically, the wafer 1040 can be termed a substrate. The substrate can be a semiconductor material such as Si, or doped Si, or a dielectric material such as alumina, or glass, or even a conductive material, such as metal. The substrate can be any shape such as, for example, a flat panel, a round drum, etcetera. The substrate can define any geometry such as, for example, a circle, a square, a polygon, etcetera. The substrate can be any size. The substrate can be any thickness which can physically accommodate the functional components of the sensor leads (e.g., optical fibers).

An opaque coating layer 2090 can be positioned directly over the sensing elements 1050 to further reduce light penetration from the ambient into the area of the sensing elements 1050. The opaque coating layer 2090 can be defined as an inner cover. This inner cover can be a piece of thin metal foil, thin Si disk, or an opaque polymer film or another opaque material that is compatible with the process.

A silicon cover 2060 is coupled to the wafer 1040. In this embodiment, the silicon cover is mechanically attached to the silicon wafer 1040 with a layer of adhesive 2080. The layer of adhesive 2080 can be a low viscosity silicone, a pressure sensitive silicon, or an epoxy. Fusion bonding or for attachment without an adhesive can also be used. Also a thin layer of $SiO_2$ can be used as a bonding material for fusion or anodic (Mallory) bonding that is compatible with high temperature (e.g. up to 1200° C.).

A strain relief 2070 is coupled to the silicon wafer 1040 and passes over the plurality of optical fibers 1030. In this embodiment, the strain relief 2070 does not need to be accommodated within the volume defined by the placement resource because the silicon cover 2060 does not extend over the strain relief 2070.

Third Embodiment

Figure 3:
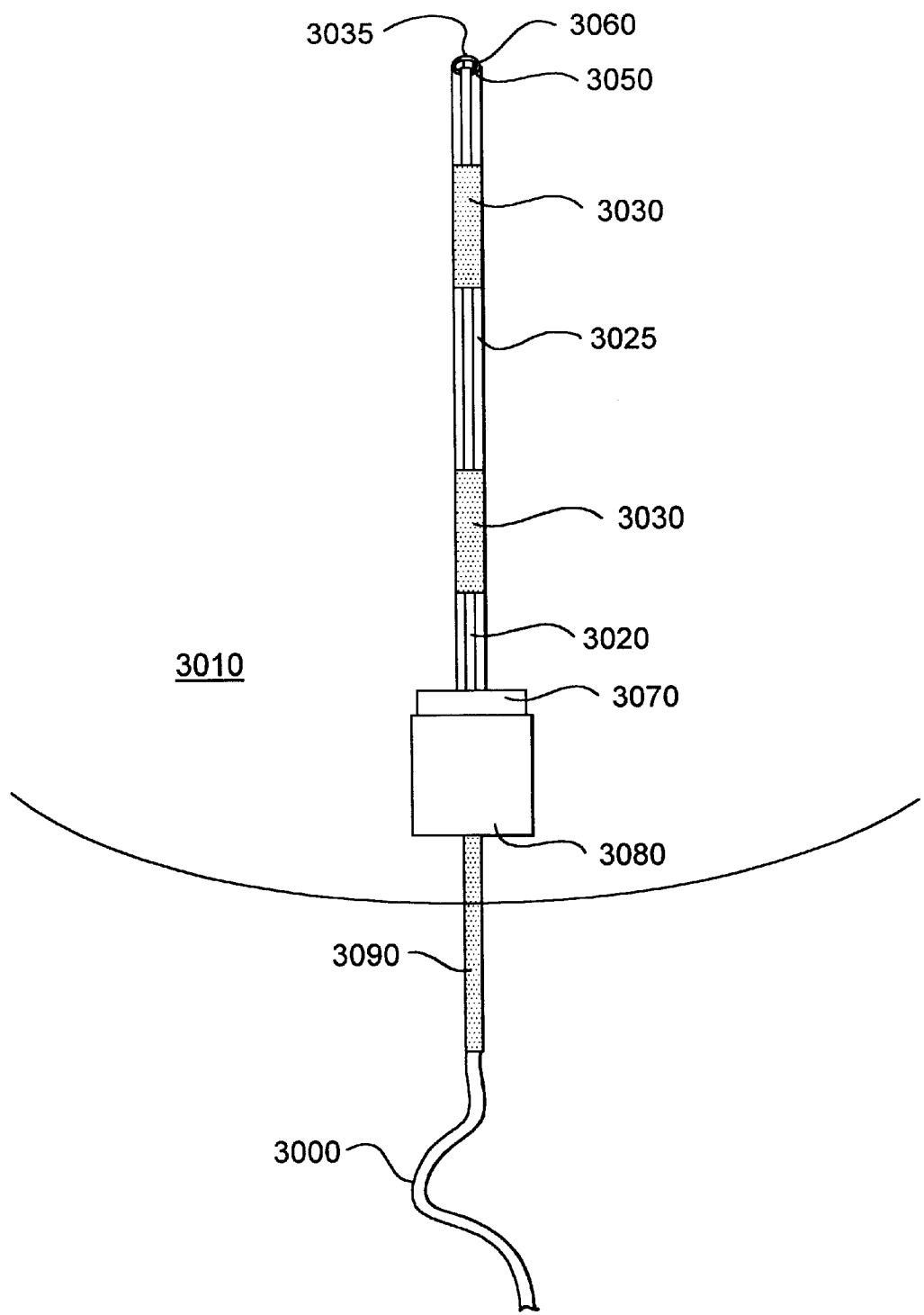
FIG. 3 illustrates a schematic top view of a third integrated wafer temperature measurement device, representing an embodiment of the invention.

Referring now to FIG. 3, a third embodiment of an integrated wafer temperature sensor device is shown. A single sensor lead 3000 having an outer jacket is coupled to a wafer 3010. The single sensor lead 3000 includes an optical fiber 3020. The optical fiber 3020 can be coated with a buffer, but should be stripped of its jacket. A placement resource 3025 can be clearly seen in FIG. 3. In this embodiment, the placement resource includes a single groove formed in the wafer 3010. The optical fiber 3020 is located in the placement resource 3025 so that it is accommodated within a volume defined by the placement resource 3025. The placement resource has a rounded terminal end 3035.

The optical fiber 3020 can run continuously to an extension cable 1080 outside of the chamber wall.

Alternatively the optical fiber 3020 can terminate near the perimeter of the wafer 3010 (a leadless sensor wafer). In this case, the optical fiber 3020 can be coupled to a second optical fiber near but not touching the terminated end of the fiber 3020. The second fiber can be routed to the outside of the chamber and interface directly or through an extension cable with the signal conditioner. In a slightly different embodiment, the signal from the optical fiber 3020 could be coupled optically across free space, e.g. through a lens (not shown).

The optical fiber 3020 is coupled to the substrate 3010 with an adhesive 3030. A sensing element 3050 is located at the end of the optical fiber 3020. The sensing element 3050 is proximate a reflective coating 3060.

The coating 3060 is first attached to the end of the placement resource 3025. The sensing element 3050 is then attached to the coating 3060. Then the optical fiber 3020 is brought close to the sensing element 3050. Alternatively, the sensing element 3050 can be first attached to the end of the fiber 3020 with the reflective coating applied to the sensing element outer surface. The fiber leads are then placed in the grooves. A strain relief 3080 is then attached to the substrate 3010. The strain relief 3080 is connected to both the substrate 3010 and the sensor lead 3000. The lead protective sleeve 3090 covers the jacketed sensor lead 3000 and is bonded to the strain relief. The optical fiber 3020 is bonded to the placement resource 3025. A cover (not shown) can then be coupled to the water 3010 so as to embed all of the reflective coating 3060, all of the sensing element 3050, all of the placement resource 3025, a portion of the sensor lead 3000, and most of the optical fiber 3020. A black epoxy coating for light blockage is then applied over a portion of the optical fiber 3020 between the end of the cover and the strain relief. A ceramic coating 3070 to protect the epoxy from being etched by the plasma is then formed over the optical fiber 3020 and the substrate 3010.

A protective sheath 3090 surrounds a portion of the single sensor lead 3000. The purpose of the protective sheath 3090 is to limit direct bombardment of the jacketed fiber in the area near the edge of wafer 3010. The purpose of the sheath 3090 is also to support the sensor lead 3000 which may have reduced flexural strength due to degradation of the fiber coating. The sheath 3090 can be made of ceramic material.

Fourth Embodiment

Figure 4:
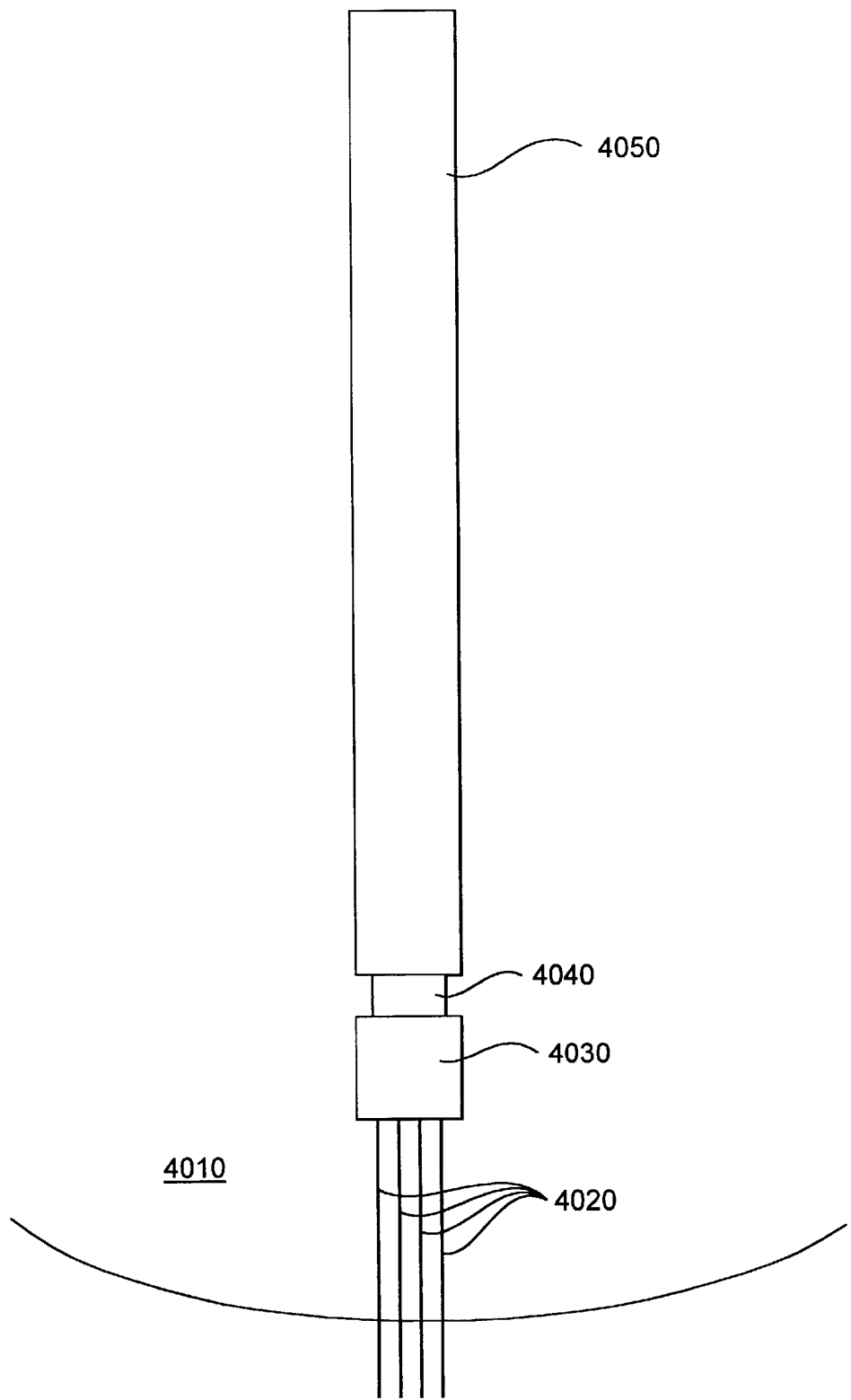
FIG. 4 illustrates a schematic top view of a fourth integrated wafer temperature measurement device, representing an embodiment of the invention.

Referring now to FIG. 4, a fourth embodiment of an integrated wafer temperature sensor device is shown. Four sensor leads 4020 are coupled to a Si substrate 4010. Each of the sensor leads 4020 includes an optical fiber. All of the sensor leads 4020 pass beneath a strain relief device 4030. The optical fibers that compose the sensor leads 4020 then pass beneath a ceramic coating 4040. The embedded portion of the sensor leads 4020 are located within a placement resource (not shown) and beneath a silicon cover 4050. The silicon cover 4050 is mechanically connected to the substrate 4010 with an adhesive.

The particular material used for the adhesive should be stable under the temperature range to be characterized by the sensors. Conveniently, the adhesive of the invention can be made of any adhesive material. It is preferred that the material be chemically stable. It is an advantage to employ a low viscosity adhesive material to attain a very thin bonding layer so that the light penetration through this layer is minimized and heat transfer between the cover and substrate is optimized.

However, the particular material selected for the adhesive is not essential to the invention, as long as it provides the described function. Normally, those who make or use the invention will select the best commercially available material based upon the economics of cost and availability, the expected application requirements of the final product, and the demands of the overall manufacturing process.

The strain relief device 4030 can be provided by a discrete structure as shown in FIG. 4. This structure can be a U-shaped conduit that is bonded to the substrate 4010 with an epoxy. This structure can be made of silicon, or a ceramic such as, for example, alumina. Alternatively, the function of strain relief can be provided by an integral structure. In this case, the strain relief structure would be composed of the same material as the substrate.

General Description

Without reference to any particular drawing, various aspects of the invention will now be described in more detail. These aspects are grouped into several subsections.

1. The Sensors

Preferably, the invention uses fiber optic temperature sensors. These sensors are ideal for the plasma environment to which the semiconductor wafers will be exposed.

Fiber optic temperature sensors that are compatible with the invention are readily commercially available from Luxtron Corporation of Santa Clara, Calif. or Nortech Corporation of Canada. The fiber optic sensors that are available from Luxtron Corporation use a phosphorescent material. The emission signal from the material is a function of temperature. The decay time of the emission signal is a function of the temperature. Specifically, as the temperature increases, the decay occurs more rapidly. The fiber optic sensors from Nortech use a semiconductor material. The band gap shift of the material measured optically is a function of temperature.

These phosphor materials can include europium-doped lanthanum oxysulfide, manganese doped magnesium fluorogermanate, or chromium doped garnet. In general, the phosphorescent material can include any of the compositions set forth in U.S. Pat. No. 4,448,547. The semiconductor sensor materials can be GaAs, or GaAlAs or Si.

Typically, the upper temperature range of the invention with a photoluminescent sensor during temperature measurement will be on the order of approximately 300° C. This upper range can be readily satisfied by the use of photoluminescent materials in conjunction with the fiber optic cables. The phosphorescent materials are fully functional up to a temperature of approximately 400° C. Other photoluminescent materials can be used to extend the upper temperature range of the invention to well above 500° C. However, the upper temperature range of the invention may be limited by the buffer material that surrounds the fiber optic or other temperature sensitive components.

The disclosed embodiments show fiber optic sensors as the structure for performing the function of temperature sensing, but the structure for temperature sensing can be any other structure capable of performing the function of generating temperature measurement data. For example, the invention can use resistance thermal detection (RTD) temperature sensors. These can be thin film resistive devices composed of, for example, platinum wherein the resistance is a function of the temperature of the device. Provided that environmental compatibility is not an issue, the invention can also use thermocouples, thermistors, or any other temperature sensor with a lead.

The invention can also use a fiber optic temperature sensor based on a laser crystal such as, for example, YAG (yttrium aluminum garnet). The temperature sensor can also be based on an interferometric cavity such as, for example, a Fabry-Perot structure. The fiber-optic temperature measurement can also be executed as a pyrometric measurement, based on the amount of radiation emitted from a closed structure with an emissivity close to 1 (a black body) that is formed in the volume created by the placement resource and the cover.

Moreover, the sensors do not have to be for measuring temperature. The sensors can be for characterizing any property of interest, not just temperature. For example, the sensors can be for detecting ion current, ion energy, film thickness, optical emission or absorption, heat flux, etch rate or any other property of interest.

2. Making the Device

In a process of making the invention, first the grooves are formed, second the sensors are provided, third the sensors are attached, fourth the cover is attached to the portion of the wafer containing the sensors and the sensor leads. Finally, a strain relief is mounted near the end of the cover and over the fibers extending from the cover.

In one embodiment of the invention, the subassemblies are combined as follows. A bundle is formed composed of the fibers. The jackets of the portion of the fibers that are to be embedded are then stripped. The grooves are formed in the semiconductor wafer. The end of the grooves is first coated with a ceramic (a reflective layer) and then coated with a thin phosphor layer. The fibers are then brought close to the precoated phosphor material. The fibers are then secured in the grooves using an adhesive such as epoxy. A cover plate is then located and affixed over the grooves using an epoxy, silicone, or pressure sensitive adhesive. A strain relief is then applied. Finally, the invention is tested and calibrated.

The grooves should be slightly oversized to i) allow the sensors to be fitted and ii) to allow for strain relief during temperature ramping up and down. The grooves can be formed by mechanical cutting. Alternatively, the grooves can also be formed by ultrasonic machining or laser cutting or acid etching.

There are several ways to machine the trenches. A trench can be cut to a desired depth with an abrasive cutting wheel. Alternatively, a hole can be drilled in the side of the wafer to form a cave. Alternatively, a recess call be milled in the substrate. In the case of a recess, the cover plate can be shaped to fit within the recess, thereby providing a flush upper surface along the plane defined by the wafer.

The grooves can be formed with a flat bottom to avoid crack propagation through the wafer. This is in contrast to a small radius of curvature round bottom which may function as a crack tip.

When fabricating the trenches, it is desirable to avoid cutting along specific crystal planes in the wafer to reduce the risk of cleaving the wafer when it is stressed. It is also desirable to avoid the creation of defects. Defects can cause stress propagation.

The particular manufacturing process used for forming the placement resource should be inexpensive and reproducible. Conveniently, the placement resource of the invention can be carried out by using any material removal method. It is preferred that the process be clean and not likely to create defects. For the manufacturing operation, it is an advantage to employ an etching method.

However, the particular manufacturing process used for forming the placement resource is not essential to the invention as long as it provides the described transformation. Normally those who make or use the invention will select the manufacturing process based upon tooling and geometry requirements, the expected application requirements of the final product, and the demands of the overall manufacturing process.

The sensing material or the emitting surface is provided near the ends of the trenches. The sensor leads are attached to the wafer with the strain relief. The ends of the leads coupled to the sensing material. The sensor leads are bonded to the interior of the trenches. The light blocking material is then placed over the sensor tip or over the emitting surface area. The cover is attached to the wafer with an adhesive material. The ceramic coating is provided near the strain relief. The use of a low viscosity adhesive material helps to achieve a very thin bonding layer between the cover and the substrate. This results in close attachment of the cover to the substrate and reduces light penetration.

3. Coupling the Integrated Wafer Sensors to the Signal Conditioner via the Optical Cable The sensor leads require that a feedthrough be provided in the wall of the processing chamber. One way to do this is to provide optical coupling between fibers on the wafer and optics attached to the chamber feed through. In this way, an optical coupling can be provided. Excitation energy from outside the chamber can be directed through the feed through across the optical length and into the sensor fibers. Consequently, emission signals from the sensors can be optically coupled to the feed through and routed out of the chamber.

In addition, the optical coupling concept can be expanded to multiplexing. For example, a series of sensors can be addressed one at a time via a time multiplexing scheme. Alternatively, a series of sensors can be simultaneously addressed using wavelength division multiplexing. The coupling port can be expanded to convey additional parameter data, for example ion current, ion energy, film thickness, optical emission or absorption spectrum, heat flux and etch rate.

While not being limited to any particular performance indicator or diagnostic identifier, preferred embodiments of the invention can be identified one at a time by testing accurate temperature measurement. The test for accurate temperature measurement can be carried out without undue experimentation by the use of a simple and conventional calibration experiment.

EXAMPLES

Specific embodiments of the invention will now be further described by the following, nonlimiting examples which will serve to illustrate in some detail various placement resource features of significance. The examples are intended merely to facilitate an understanding of ways in which the invention may be practiced and to further enable those of skill in the art to practice the invention. Accordingly, the examples should not be construed as limiting the scope of the invention.

Figure 5A:
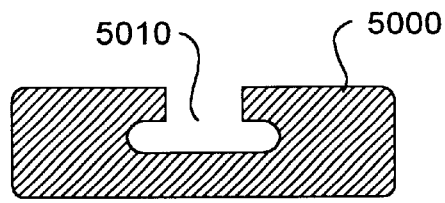
FIGS. 5A–5D illustrate schematic cross-sections of a variety of placement resource profiles for accommodating temperature sensor leads, representing embodiments of the invention.
Figure 5B:
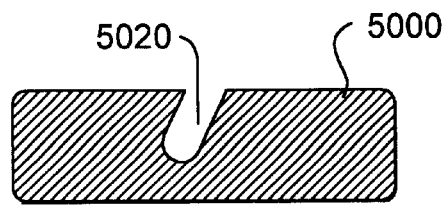
Figure 5C:
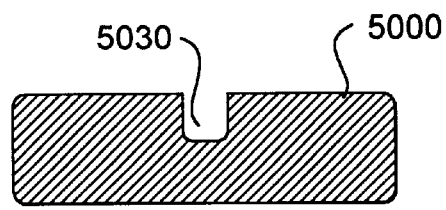
Figure 5D:
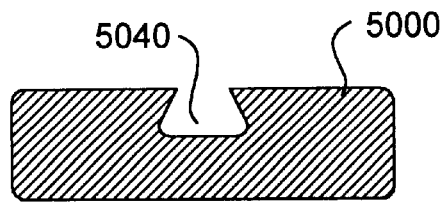

Referring now to FIGS. 5A–5D, four examples of placement resources within a substrate 5000 are depicted. The placement resource cross section views shown in FIGS. 5A–5D can be termed placement resource profiles. FIG. 5A shows an inverted T-shaped groove 5010 with four rounded corners. FIG. 5B shows a slanted groove 5020 with a slanted groove. FIG. 5C shows a straight side wall groove 5030 with small radius edges. FIG. 5D shows an undercut groove 5040 with rounded base corners.

Figure 6A:
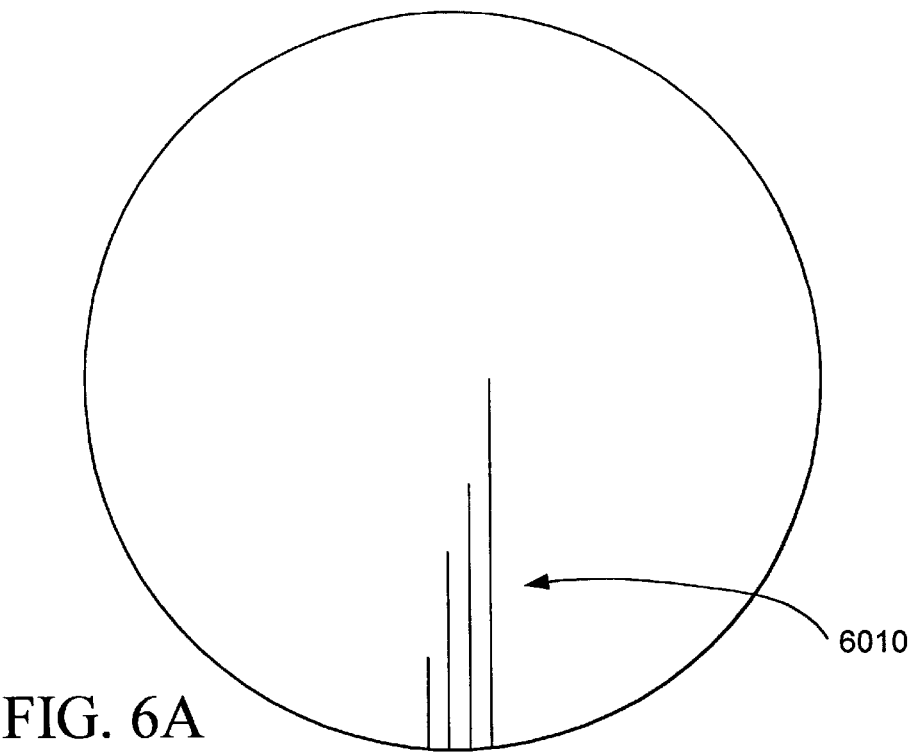
FIGS. 6A–6D illustrate schematic top views of a variety of placement resource patterns for accommodating temperature sensor leads, representing embodiments of the invention.
Figure 6B:
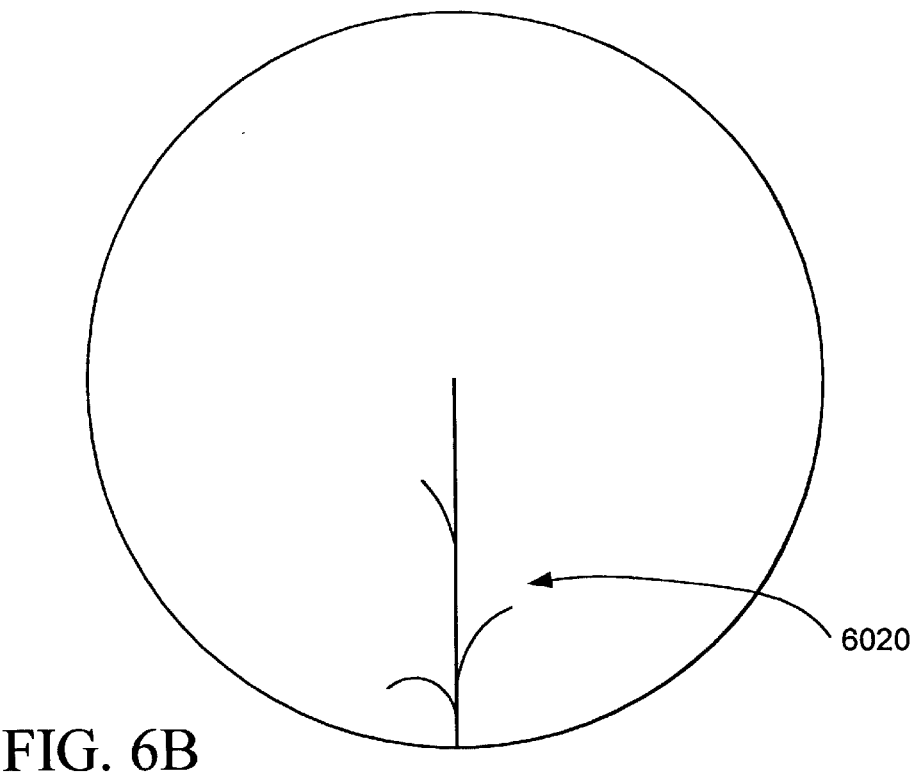
Figure 6C:
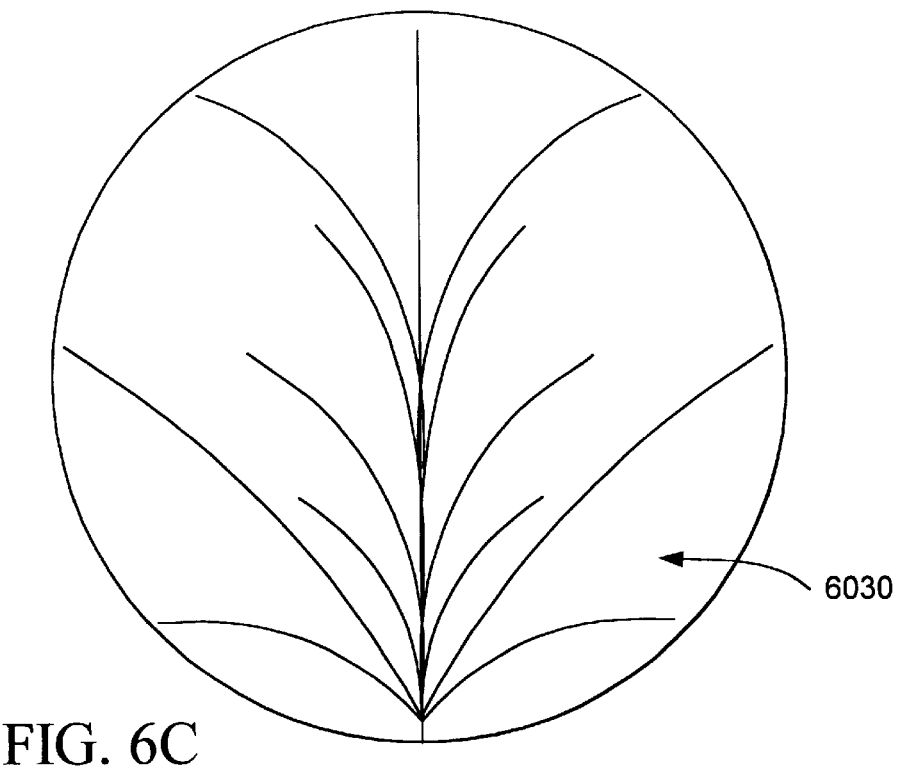
Figure 6D:
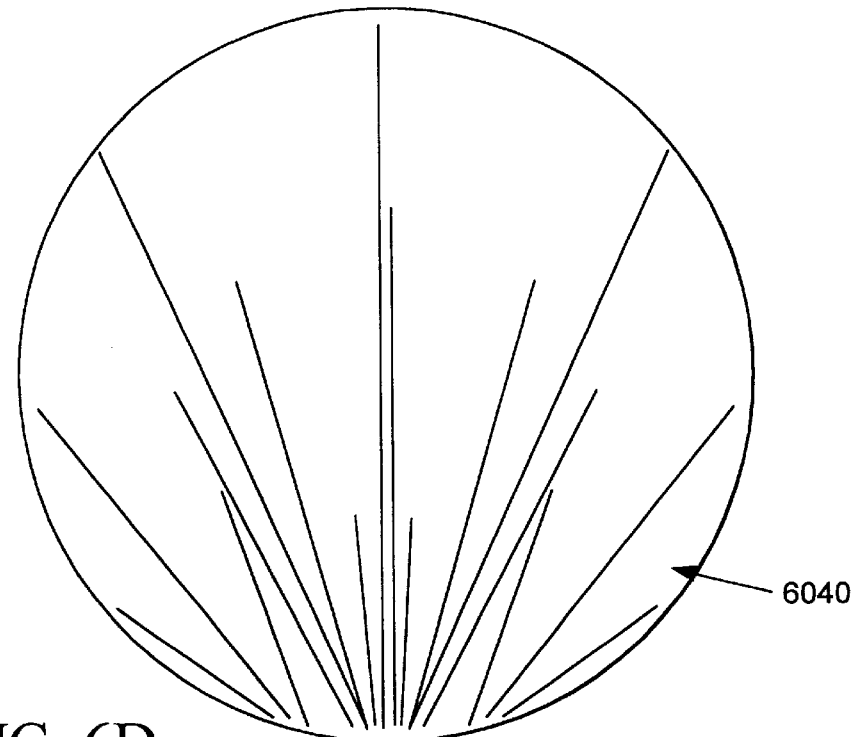

Referring now to FIGS. 6A–6D, four examples of arrangements for organizing the placement resource according to the present invention are depicted. The placement resource top views shown in FIGS. 6A–6D can be termed placement resource patterns. FIG. 6A shows a parallel pattern 6010 for arranging the placement resource. The parallel pattern 6010 is defined by a plurality of substantially parallel grooves of incrementally decreasing length. FIG. 6B shows a grape vine pattern 6020 for arranging the placement resource. The grape vine pattern 6020 is defined by a primary groove from which a plurality of minor grooves extend along optionally variable radii of curvature. FIG. 6C shows a bush pattern 6030 for arranging the placement resource. The bush pattern 6030 is defined by a main groove from which a plurality of sets of lesser grooves extend along radii of curvature that differ for each set. FIG. 6D shows a starburst pattern 6040 for arranging the placement resource. The starburst pattern 6040 is defined by a plurality of substantially nonparallel grooves resources that converge toward a single area.

Without regard to any particular drawing, when the volume of the grooves is excessively low, there may not be enough capacity to accommodate sufficient sensors for obtaining representative data. For example, a 16 channel sensor array will require enough groove volume to define a volume sufficient to accommodate 16 sensors. On the other hand, when the volume of the grooves is excessively high, the substrate may be weakened. This may be more likely where some or all of the grooves are deeper than one third the thickness of the substrate.

If the length of the sensor leads within the wafer is too long, the wafer will be weakened due to the amount of material that needs to be removed. Conversely, if the length of the sensor leads within the wafer is too short, the temperature gradient along the sensor lead may alter the measured temperature. Typically, as a sensor lead exits the wafer (substrate) there is an abrupt temperature change with regard to the sensor lead. If the immersion depth of the lead within the wafer is insufficient, the gradient will be too close to the sensor material. The placement resource should route a long enough fiber so that the temperature gradient does not affect the temperature sensor. Thus, it can be advantageous to arrange the placement resource to define an optimum sensor lead length within the substrate (immersion depth). Further, it can be advantageous to balance and/or tune the relative immersion depths for a plurality of sensor leads.

The length of the placement resource that is covered is important for measurement accuracy. The removal of material in forming the placement resource reduces the strength of the substrate. However, the bonding of the cover over the placement resource in the substrate will restore some of its strength. Too long and too many placement resources may weaken the substrate and also change the average material composition and the thermal conduction of the substrate. On the other hand, too short a length of covered sensor lead may situate the thermal gradient proximate to the sensor itself, thereby affecting the temperature of the sensor and consequently the accuracy of the temperature measurement.

Practical Applications of the Invention

A practical application of the invention that has value within the technological arts is temperature measurement of wafers in processing chambers. Further, the invention is useful in conjunction with temperature measurement in plasma environments (such as are used for the purpose of etching or coating). There are virtually innumerable uses for the invention, all of which need not be detailed here.

Advantages of the Invention

An integrated wafer temperatures measurement device, representing an embodiment of the invention, can be advantageous for at least the following reasons. By placing the sensors inside the placement resources in the substrate and placing the cover over the fiber sensors, the ambient light will be prevented from getting into the light sensitive areas of the sensor and its lead. Also, the cover protects the sensor leads from getting etched or overheated by the high energy environment. Furthermore, heat transfer to the sensors is enhanced and therefore accuracy is improved. Without embedding the sensors the sensor will have a different temperature because it will exchange heat by conduction, radiation, and bombardment with the surrounding structures and gases.

The use of fiber optic temperature sensors embedded in the substrate in combination with a cover allows data to be taken from the sensors while the wafer is in a plasma environment (i.e., an etch or deposition environment). The plasma environment is luminous. The plasma can introduce noise to the fiber optic signals. A silicon cover is substantially opaque to radiation with wave lengths shorter than approximately 1.1 microns. The emission signal from many photoluminescent materials is in the visible and near infrared, less than 1 micron wavelength. Therefore, the silicon cover effectively blocks the luminous plasma from inducing noise in the fiber optic sensors.

The amount of energy in an oxide etch plasma can be $8W/cm^2$. This etching process could etch away the sensor and the lead materials very quickly if the sensor and the lead are not protected by an inert cover. A Si cover in such environment safely protects the sensors embedded in the substrate.

If the cover is composed of the same material as the substrate, the thermal properties will be the same. By matching the thermal properties both the cover and the substrate will respond to the heating mechanism identically.

If the fiber-optic temperature measurement relies on the amount of radiation emitted from the wafer, the cover that is opaque to near infrared radiation has the advantage that a black-body with known emissivity of 1 is formed inside the wafer and the fiber is shielded from ambient radiation, that strongly disturbs any pyrometric fiber-optic measurement at wavelength in the range of 0.8 to 2 $\mu$m, because the emitted radiation from a wafer is often much smaller than the ambient radiation.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configurations, but could be provided in virtually any shape, and assembled in virtually any configuration. Further, the individual components need not be fabricated from the disclosed materials, but could be fabricated from virtually any suitable materials. Further, although the integrated wafer temperature sensor described herein is a physically separate module, it will be manifest that the integrated wafer temperature sensor may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A parameter measuring structure, comprising:
    a substrate having opposing external surfaces,
    a plurality of elongated cavities within the substrate between the opposing surfaces, the cavities individually having lengths defined by first and second ends, the second cavity ends being spaced apart from each other in directions across the surfaces,
    a plurality of optical sensors of the parameter positioned within the individual cavities adjacent their respective second ends, and
    at least one optical fiber entering the first ends of individual ones of the plurality of cavities from outside of the substrate and extending along the lengths of the cavities with ends of the optical fibers being coupled to the optical sensors of their respective cavities.

2. The structure of claim 1, wherein the optical sensors individually include phosphorescent material that emits radiation dependent upon the parameter being measured.

3. The structure of claim 1, wherein the optical sensors individually include a black body structure.

4. The structure of claim 1, wherein the optical sensors individually include an interferometric cavity.

5. The structure of any one of claims 1–4, wherein the parameter being measured is the temperature of the optical sensor.

6. The structure of any one of claims 1–4, wherein the optical sensors are attached to inside walls of the respective cavities.

7. The structure of any one of claims 1–4, wherein the optical sensors are attached to the ends of their respective optical fibers.

8. The structure of any one of claims 1–4, which additionally comprises an opaque layer positioned over the individual optical sensors to block ambient light outside of the structure from penetrating into areas including the sensors.

9. The structure of claim 1, wherein the substrate is formed of first and second pieces of material having respective internal surfaces that are attached together, the cavities being formed by the internal surface of the second piece of material positioned over grooves in the internal surface of the first piece of material.

10. The structure of claim 9, wherein the internal surfaces of the first and second pieces of material have the same size and shape.

11. The structure of claim 10, wherein the internal surfaces of the first and second pieces of material are circular with the same diameter.

12. The structure of claim 9, wherein the first piece of material is significantly larger that the second piece of material.

13. The structure of any one of claims 9–12; wherein the first and second pieces of material have substantially the same thermal properties.

14. The structure of any one of claims 9–12, wherein the first and second pieces are made of a common material.

15. The structure of claim 14, wherein the common material is silicon.

16. The structure of any one of claims 9–12, wherein the first and second pieces protect the sensors and optical fibers in the cavities from a plasma ion bombardment of 8 watts per square centimeter.

17. The structure of any one of claims 9–12, wherein the first and second pieces are opaque to light radiation within a range of wavelengths less than 1.1 micron.

18. The structure of claim 1, wherein the first ends of the cavities individually form openings to an outside of the structure.

19. The structure of claim 1, wherein the first ends of the individual cavities are joined together within the substrate to an entrance passage through which the optical fibers pass from the outside of the substrate and into the first ends of said cavities.

20. The structure of either of claims 18 or 19, which additionally comprises an attachment of the optical fibers to the substrate outside of the cavities that relieves strain on the optical fibers within the cavities.

21. The structure of either of claims 18 or 19, wherein the opposing external surfaces of the substrate are flat surfaces that are parallel with each other.

22. The structure of claim 21, wherein the elongated cavities are parallel with the external surfaces.

23. A test structure for measuring a distribution of temperature thereacross, comprising:
    a substrate having opposing external surfaces that are flat and parallel to each other,
    a plurality of elongated cavities within the substrate between the opposing surfaces that extend in a direction parallel to said surfaces, the cavities individually having lengths defined by first and second ends, the second cavity ends being spaced apart from each other in directions across the surfaces,
    a plurality of optical temperature sensors positioned within the individual cavities at their respective second ends,
    a plurality of optical fibers including at least one optical fiber entering the first end of each of the plurality of cavities from outside of the substrate and extending along the length of its respective cavity to a position adjacent the second end of the cavity and coupled to the optical temperature sensor thereat, and
    light opaque material positioned with respect to the individual optical temperature sensors to block light from reaching said sensors from outside of the test structure.

24. The structure of claim 23, wherein the optical sensors individually include phosphorescent material that emits radiation dependent upon its temperature.

25. The structure of claim 23, wherein the optical sensors individually include a black body structure.

26. The structure of either of claims 24 or 25, wherein the optical sensors are attached to inside walls of their respective cavities.

27. The structure of either of claims 24 or 25, wherein the optical sensors are attached to the ends of their respective optical fibers.

28. The structure of claim 23, wherein the substrate is formed of first and second pieces of material having respective internal surfaces that are attached together, the cavities being formed by the internal surface of the second piece of material positioned over grooves in the internal surface of the first piece of material.

29. The structure of claim 28, wherein the internal surfaces of the first and second pieces of material have the same size and shape.

30. The structure of claim 29, wherein the internal surfaces of the first and second pieces of material are circular with the same diameter.

31. The structure of claim 28, wherein the first piece of material is significantly larger that the second piece of material.

32. A method of measuring a distribution of temperature across a test structure within a plasma processing chamber, comprising positioning the test structure of any one of claims 23–25 or 28–31 within a plasma processing chamber.

33. The method of claim 32, additionally comprising bombarding the test structure with a density of ions of at least 8 watts per square centimeter.

34. The structure of any one of claims 28–31, wherein the first and second pieces of material have substantially the same thermal properties.

35. The structure of any one of claims 28–31, wherein the first and second pieces are made of a common material.

36. The structure of claim 35, wherein the common material is silicon.

37. The structure of any one of claims 28–31, wherein the first and second pieces protect the sensors and optical fibers in the cavities from a plasma ion bombardment of 8 watts per square centimeter.

38. The structure of any one of claims 28–31, wherein the first and second pieces are opaque to light radiation within a range of wavelengths less than 1.1 micron.

39. The structure of claim 23, wherein the first ends of the cavities individually form openings to an outside of the structure.

40. The structure of claim 23, wherein the first ends of the individual cavities are joined together within the substrate to an entrance passage through which the optical fibers pass from the outside of the substrate and into said first cavity ends.

41. The structure of either of claims 39 or 40, which additionally comprises an attachment of the optical fibers to the substrate outside of the cavities that relieves strain on the optical fibers within the cavities.

* * * * *